US010865888B2

(12) United States Patent
Grosskopf et al.

(10) Patent No.: US 10,865,888 B2
(45) Date of Patent: Dec. 15, 2020

(54) CONNECTION FITTING AND HEAT MANAGEMENT MODULE INCLUDING SAME

(71) Applicant: Schaeffler Technologies AG & Co. KG, Herzogenaurach (DE)

(72) Inventors: Uli Grosskopf, Adelsdorf (DE); Michael Weiss, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/080,081

(22) PCT Filed: Feb. 3, 2017

(86) PCT No.: PCT/DE2017/100073
§ 371 (c)(1),
(2) Date: Aug. 27, 2018

(87) PCT Pub. No.: WO2017/144047
PCT Pub. Date: Aug. 31, 2017

(65) Prior Publication Data
US 2019/0085987 A1 Mar. 21, 2019

(30) Foreign Application Priority Data
Feb. 26, 2016 (DE) .................. 10 2016 203 070

(51) Int. Cl.
*F16K 5/20* (2006.01)
*F16K 5/06* (2006.01)
*F01P 7/14* (2006.01)

(52) U.S. Cl.
CPC ............ *F16K 5/201* (2013.01); *F16K 5/0689* (2013.01); *F01P 2007/146* (2013.01)

(58) Field of Classification Search
CPC . F16K 5/20; F16K 5/201; F16K 5/202; F16K 11/087; F16K 11/0873; F16K 11/0876; F16K 5/161; F16K 5/181
See application file for complete search history.

(56) References Cited

U.S. PATENT DOCUMENTS

| | | | |
|---|---|---|---|
| 3,960,363 A * | 6/1976 | Domyan | ............... F16K 5/0642 251/174 |
| 4,084,608 A | 4/1978 | Laignel et al. | |
| 5,253,843 A | 10/1993 | Garceau | |
| 5,533,738 A * | 7/1996 | Hoffmann | ............... F16K 5/201 277/388 |

(Continued)

FOREIGN PATENT DOCUMENTS

| | | |
|---|---|---|
| CN | 102939486 | 2/2013 |
| CN | 104662351 | 5/2015 |

(Continued)

*Primary Examiner* — David Colon-Morales
(74) *Attorney, Agent, or Firm* — Volpe and Koenig, P.C.

(57) ABSTRACT

A connection fitting (8) of a heat management module (1) of an internal combustion engine can be inserted into a receptacle hole (9) in a housing (2) of the heat management module. The aim is to be able to bias a sealing ring (16) of the nozzle against a rotary valve (3) using a compression spring element (13). The connection fitting is to be provided with a stop (24) that limits the longitudinal movement of the sealing ring in the direction of the rotary valve.

17 Claims, 2 Drawing Sheets

(56) References Cited

U.S. PATENT DOCUMENTS

| | | | |
|---|---|---|---|
| 7,484,710 B2* | 2/2009 | Koester | F16K 5/0678 |
| | | | 251/160 |
| 7,963,455 B2 | 6/2011 | Heldberg et al. | |
| 8,720,854 B2* | 5/2014 | Dalluge | F16K 5/0668 |
| | | | 251/159 |
| 9,617,906 B2* | 4/2017 | Lee | F16K 11/0876 |
| 9,695,734 B2* | 7/2017 | Carns | F01P 7/14 |
| 9,841,131 B2 | 12/2017 | Hagen et al. | |
| 9,897,217 B2* | 2/2018 | Greene | F16K 5/201 |
| 9,945,283 B2* | 4/2018 | Muizelaar | F01P 7/14 |
| 10,066,751 B2* | 9/2018 | Seko | F16K 5/0663 |
| 10,352,460 B2* | 7/2019 | Jang | F16K 11/087 |
| 10,359,138 B2* | 7/2019 | Bareis | F16K 11/085 |
| 2011/0266481 A1 | 11/2011 | Collison et al. | |
| 2011/0266484 A1 | 11/2011 | Dalluge et al. | |
| 2015/0137020 A1* | 5/2015 | Fan | F16K 5/0642 |
| | | | 251/315.01 |
| 2016/0003125 A1* | 1/2016 | Lee | F16K 11/076 |
| | | | 123/41.08 |
| 2016/0146092 A1* | 5/2016 | Lee | F01P 7/16 |
| | | | 123/41.1 |
| 2016/0160737 A1* | 6/2016 | Lee | F01P 7/14 |
| | | | 123/41.08 |
| 2016/0363236 A1* | 12/2016 | Smith | F16K 37/0041 |
| 2017/0335750 A1* | 11/2017 | Yumisashi | F01P 7/16 |
| 2018/0031132 A1* | 2/2018 | Yutani | F16K 5/0605 |
| 2018/0066758 A1* | 3/2018 | Yumisashi | F01P 7/14 |

FOREIGN PATENT DOCUMENTS

| | | |
|---|---|---|
| DE | 102009025341 | 12/2010 |
| DE | 102009025351 | 12/2010 |
| DE | 102009035349 A1 | 2/2011 |
| DE | 102010026368 | 1/2012 |
| DE | 102014206529 A1 | 10/2015 |

* cited by examiner

CONNECTION FITTING AND HEAT MANAGEMENT MODULE INCLUDING SAME

BACKGROUND

The invention relates to a connection fitting of a heat management module of an internal combustion engine, wherein this connection fitting can be inserted into a receptacle hole of a housing of the heat management module and a sealing ring of the connection fitting can be biased against a rotary valve by a compression spring element.

The invention also relates to a heat management module for a coolant circuit of an internal combustion engine with a housing and a rotary valve that is mounted in this housing so that it can rotate, wherein at least one coolant connection with a connection fitting is arranged on the housing and wherein the coolant flow via the coolant connection can be controlled by the rotary valve.

A heat management module can be used to precisely control the operating temperature of an internal combustion engine within an optimum temperature window. In this way, for example, the cold-running phase of the internal combustion engine can be significantly shortened by an opened short circuit or the operating temperature of the internal combustion engine can be limited to a maximum value. For controlling and distributing the coolant flow in a cooling system having two circuits in an internal combustion engine, a corresponding heat management module has a rotary valve that is arranged in its housing so that it can rotate and with which a mixture ratio of the coolant between the two coolant circuits can be set as a function of a given coolant temperature.

A heat management module with a connection fitting of the type specified above is known from DE 10 2014 206 529 A1. When the connection fitting is inserted into the housing of the heat management module, it must be ensured with great assembly and inspection effort that the sealing ring biased by the compression spring element in the direction of the rotary valve is positioned with sufficiently exact orientation on the rotary valve.

SUMMARY

Therefore, the object of the invention is to provide a connection fitting of a heat management module whose subsequent assembly can be performed without the risk of assembly errors.

This object is achieved by a connection fitting with one or more features of the invention. Advantageous constructions are specified below and in the claims.

A connection fitting according to the invention in a heat management module for the coolant circuit of an internal combustion engine can be inserted into a receptacle hole of a housing of the heat management module, wherein a sealing ring of the connection fitting can be biased against a rotary valve of the heat management module by a compression spring element. Here, the connection fitting should be provided with a stop that limits the longitudinal movement of the sealing ring in the direction of the rotary valve.

In other words, the connection fitting according to the invention with a compression spring element and the sealing ring biased axially against the stop represents a captive assembly unit. When the assembly unit is inserted into the housing, not only does it ensure the sufficiently exact orientation of the sealing ring relative to the rotary valve, but as a prerequisite for this, a prior loosening and falling off of the sealing ring and possibly also the compression spring element from the fitting is also prevented. Before it is inserted into the housing, a visual inspection can also be performed on the preassembled connection fitting and it can be determined whether the connection fitting was provided with all of the sealing elements. This is because the compression spring element pushes the sealing ring axially beyond the axial end of the hollow cylindrical fitting section so that, for example, a grooved ring arranged within the sealing ring is visible.

A retaining element can be fixed on the connection fitting. A radial projection that forms the stop and engages behind a section of the sealing ring extends from this retaining element. The retaining element can be a retaining bushing that is fixed on a projection running in the axial direction or in a recess of the connection fitting. The projection can be provided with a matching surface with which the connection fitting is guided and optionally pressed into the receptacle hole of the housing.

The radial projection of the retaining bushing can be constructed as an at least partially circumferential first collar that points radially inward and engages behind the section of the sealing ring. The section of the sealing ring is preferably formed as a radially outward pointing second collar. The retaining bushing can be made from metal or plastic.

The connection fitting can have a hollow cylindrical connection fitting and a flange formed together with this connection fitting and pointing radially outward, wherein a sleeve with a radial distance to the outer lateral surface of the fitting section extends as a projection from the flange and wherein the retaining bushing is mounted on this sleeve. For assembling the connection fitting, first the compression spring element is pushed over the fitting section until it contacts the flange. Then the sealing ring is mounted together with a grooved ring held therein onto the fitting section. After a radial sealing element is pushed onto the sleeve, lastly the retaining bushing is mounted on the sleeve, preferably by an interference fit assembly. In this way, the entire connection fitting is preassembled and all that still needs to be done is for it to be inserted into the receptacle hole.

The sealing ring is preferably made from a thermoplastic in order to be able to form a reliable and complete seal on the circumference of the rotary valve. There is also the possibility of producing only the end section of the sealing ring interacting with the rotary valve from a thermoplastic, while the other area is made from a different material.

The first collar of the retaining bushing must be positioned axially for its assembly on the connection fitting so that the sealing ring is raised from the rotary valve after the assembly of the connection fitting into the housing and lifts from the stop against the force of the compression spring element.

The radial sealing element that is arranged axially between the flange and the retaining bushing and encloses the sleeve circumferentially seals the gap between the connection fitting and the housing.

The grooved ring held in a ring-shaped recess of the sealing ring has the effect that the tightness of the connection fitting is secured independent of the respective relative position of the sealing ring relative to the fitting section. The grooved ring can be made from an elastomer material and can have a sealing lip contacting the outer lateral surface of the fitting section. The end of the compression spring element can form a direct contact on the grooved ring or both on the sealing ring and also on the grooved ring.

The compression spring element is a ring-shaped corrugated spring or alternatively a helical spring or a laminated disc spring.

A heat management module for a coolant circuit of an internal combustion engine has a housing and at least one rotary valve supported in this housing so that it can rotate, wherein at least one coolant connection with a connection fitting according to the invention is arranged on the housing. The amount of coolant flowing in or out via the respective connection fitting can be controlled by the rotary valve.

BRIEF DESCRIPTION OF THE DRAWINGS

A preferred embodiment of the invention is explained in more detail below with reference to the figures. Shown are.

DETAILED DESCRIPTION

Figure 1:
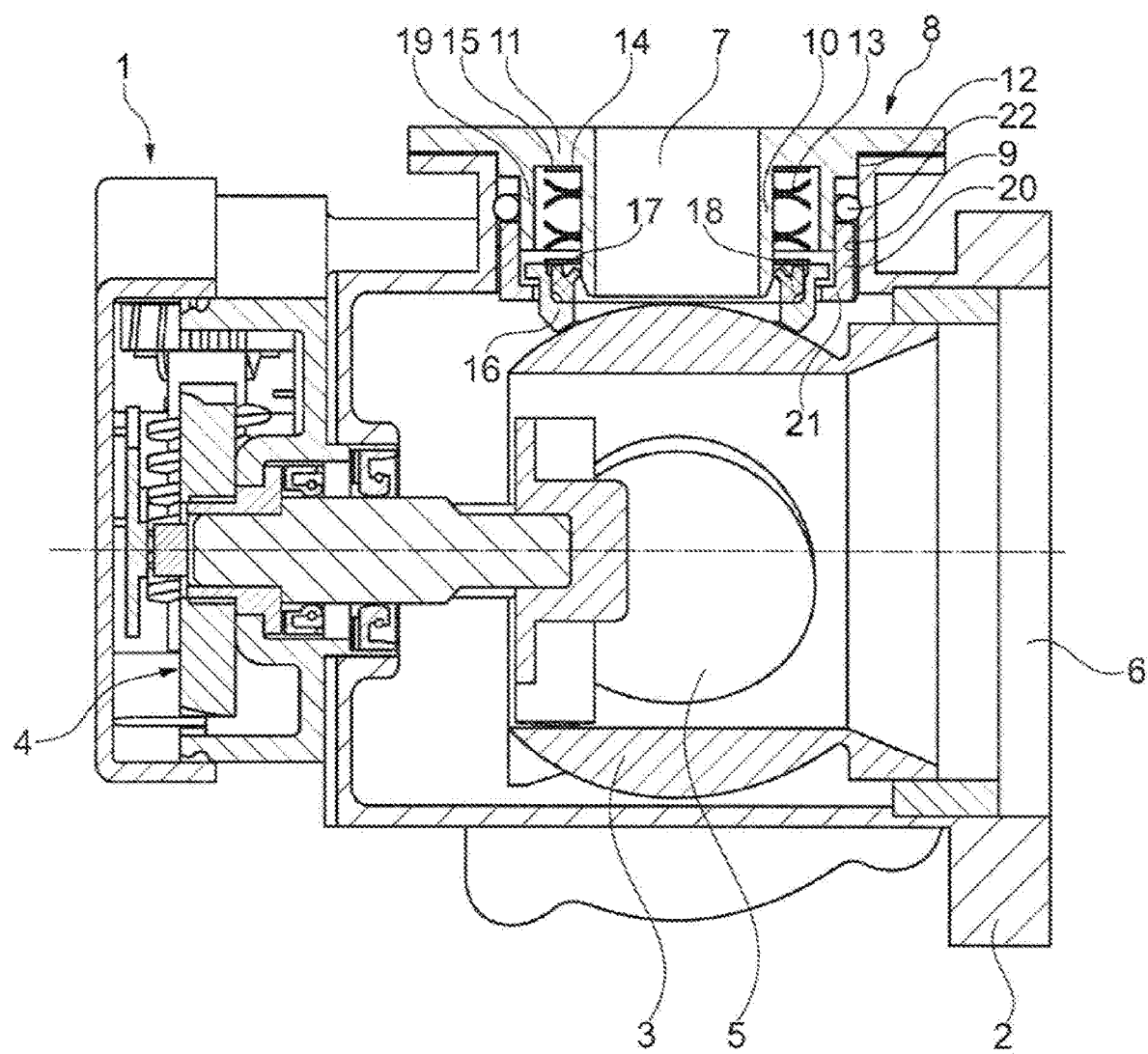
FIG. 1 a longitudinal section through a heat management module with a rotary valve and a connection fitting constructed according to the invention, and FIG. 2 a longitudinal section of the preassembled connection fitting.

FIG. 1 shows a heat management module 1 for controlling coolant flows of a not-shown internal combustion engine. The heat management module 1 has a housing 2 in which a rotary valve 3 with a spherical outer contour is supported so that it can rotate. The rotary valve 3 is rotated about its longitudinal axis by a drive unit 4 and has a control opening 5 that produces the connection between a coolant connection 6 and a coolant connection 7 according to the position of the rotary valve 3. If the rotary valve 3 is rotated by 90° from the shown blocked position, the coolant connections 6, 7 now communicate with each other via the control opening 5.

As can be further seen in FIG. 1, the coolant connection 7 is formed by a connection fitting 8 that is inserted into a receptacle hole 9 of the housing 2. The connection fitting 8 has a hollow cylindrical fitting section 10 and a flange 11 that points radially outward and with which the connection fitting 8 is flanged and if necessary screwed onto the housing 2. The connection fitting 8 is pressed with a cylindrical matching surface 12 into the receptacle hole 9 and holds a compression spring element 13 that surrounds the fitting section 10 as a ring-shaped corrugated spring and is supported with its first end 14 on an end face 15 of the flange 11 facing the rotary valve 3.

The connection fitting 8 comprises a sealing ring 16 that is guided so that it can move longitudinally on the outer lateral surface of the fitting section 10 and is biased by the compression spring element 13 in the direction of the rotary valve 3 and forms a sealing contact with its outer contour. For this purpose, the compression spring element 13 contacts, with its second end 17, a grooved ring 18 held within the sealing ring 16.

The connection fitting 8 further comprises a sleeve 19 that extends with a radial distance to the outer lateral surface of the fitting section 10 and the receptacle hole 9 and extends from the end face 15 of the flange 11. On the sleeve 19, a retaining bushing 20 is mounted that surrounds the sleeve 19 via an interference fit assembly and has, on its end section facing the rotary valve 3, a radially inward, surrounding first collar 21. Between the flange 11 and the retaining bushing 20 there is a radial sealing element 22, here an O-ring, which surrounds the sleeve 19 and forms a sealing contact in the receptacle hole 9.

Figure 2:
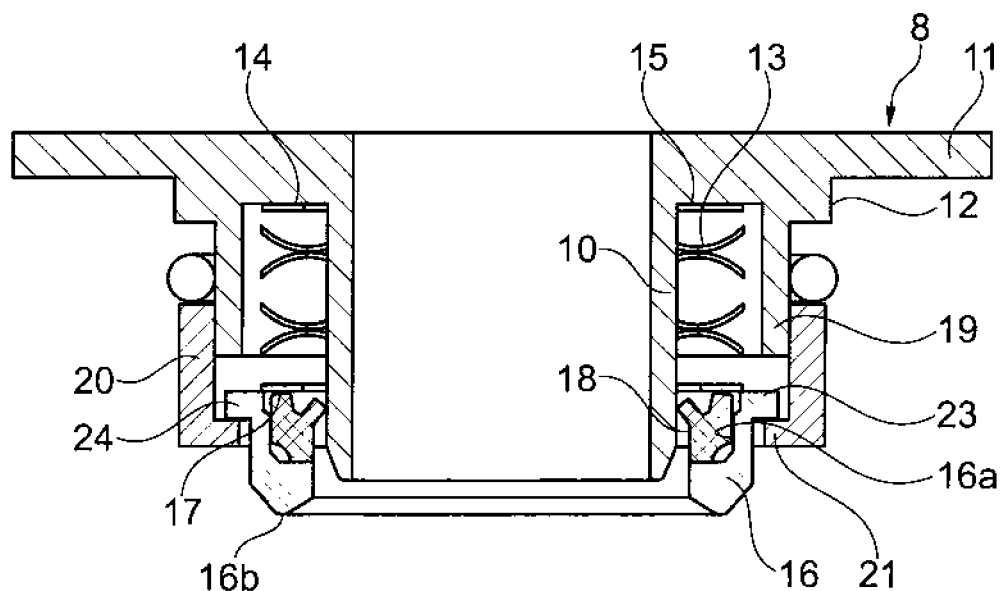

As can be seen clearly from FIG. 2, the sealing ring 16 has a cylindrical recess 16a for the grooved ring 18, a second collar 23 pointing radially outward, and an axially oriented sealing lip 16b for forming a sealing contact on the rotary valve 3. The first collar 21 of the retaining bushing 20 engages behind the second collar 23 of the sealing ring 16, wherein the contacting collars 21 and 23 form an axial stop 24 that limits the axial movement of the sealing ring 16 in the direction of the rotary valve 3. The axial travel of the sealing ring 16 up to the stop position can be set during the preassembly of the connection fitting 8 by the axial contact pressure measure of the retaining bushing 20 on the sleeve 19.

In FIG. 2, the connection fitting 8 is shown in the preassembled state before it is inserted into the receptacle hole 9 of the housing 2. The compression spring element 13 that presses onto the sealing ring 16 would push this from the hollow cylindrical fitting section 10 if the stop 24 were not limiting the axial outward movement of the sealing ring 16. In contrast, the sealing ring 16 in FIG. 1 is on the circumference of the rotary valve 3, wherein the collar 23 and the collar 21 are axially spaced apart.

LIST OF REFERENCE SYMBOLS

1 Heat management module
2 Housing
3 Rotary valve
4 Drive unit
5 Control opening
6 Coolant connection
7 Coolant connection
8 Connection fitting
9 Receptacle hole
10 Hollow cylindrical fitting section
11 Flange
12 Circumferential matching surface
13 Compression spring element
14 First end
15 End face
16 Sealing ring
16a Cylindrical recess
16b Axially oriented sealing lip
17 Second end
18 Grooved ring
19 Sleeve
20 Retaining bushing
21 First collar
22 Radial sealing element
23 Second collar
24 Axial stop

The invention claimed is:

1. A connection fitting of a heat management module of an internal combustion engine, said connection fitting being adapted to be inserted into a receptacle hole of a housing of the heat management module and comprising a sealing ring and a compression spring, the sealing ring includes a first axial end that is adapted to be biased against a rotary valve by the compression spring, the sealing ring includes a stop defined at a second axial end, opposite from the first axial end that limits a longitudinal movement of the sealing ring in a direction of the rotary valve, the sealing ring defining a cylindrical recess defined on a radially inner surface of the sealing ring in which a ring-shaped grooved ring is held, the ring-shaped groove ring including a sealing lip extending radially inward and contacting a hollow cylindrical fitting section of the connection fitting.

2. The connection fitting according to claim 1, further comprising a retaining element fixed on the connection fitting, from which a radial projection forming a secondary stop extends, which engages behind the stop of the sealing ring.

3. The connection fitting according to claim 2, wherein the retaining element is constructed as a retaining bushing that is fixed on a radially outer surface of a projection that extends in an axial direction.

4. The connection fitting according to claim 2, wherein the radial projection is constructed as a first collar that is at least partially circumferential and points radially inward.

5. The connection fitting according to claim 2, wherein the section of the sealing ring is constructed as a second collar pointing radially outward.

6. The connection fitting according to claim 3, wherein the hollow cylindrical fitting section includes a flange pointing radially outward and a sleeve with a radial distance to an outer lateral surface of the fitting section extends from the flange as a projection, on which the retaining bushing is mounted.

7. The connection fitting according to claim 6, wherein the retaining bushing is pressed onto the sleeve.

8. The connection fitting according to claim 6, further comprising a radial sealing element that encloses the sleeve arranged axially between the flange and the retaining bushing.

9. The heat management module comprising the housing and the rotary valve that is rotatably supported in the housing, and the connection fitting of claim 1 arranged on the housing, with a coolant flow through the connection fitting being controllable by the rotary valve.

10. A connection fitting of a heat management module of an internal combustion engine, said connection fitting comprising:
 a fitting body that is insertable into a receptacle hole of a housing of the heat management module;
 a sealing ring that is movable in an axial direction relative to the fitting body, the sealing ring including a first axial end that is adapted to be biased against a rotary valve by a compression spring, and a second axial end, opposite from the first axial end that includes a stop that limits a longitudinal movement of the sealing ring in the axial direction, the sealing ring defining a cylindrical recess defined on a radially inner surface of the sealing ring in which a ring-shaped grooved ring is held, the ring-shaped groove ring including a sealing lip extending radially inward and contacting a hollow cylindrical fitting section of the connection fitting; and
 the compression spring biases the sealing ring in an axial direction away from the fitting body such that it is adapted to be pressed against the rotary valve of the heat management module.

11. The connection fitting of claim 10, further comprising a retaining element having a radial projection and being fixed on the fitting body, and the radial projection forms a secondary stop that engages behind the stop of the sealing ring.

12. The connection fitting of claim 11, wherein the retaining element comprises a retaining bushing that is fixed on the fitting body.

13. The connection fitting of claim 12, wherein the hollow cylindrical fitting section includes a flange that extends radially outward, a sleeve that is spaced apart radially from an outer lateral surface of the fitting section extends from the flange, and the retaining bushing is mounted on the sleeve.

14. The connection fitting of claim 13, wherein the retaining bushing is pressed onto the sleeve.

15. The connection fitting of claim 13, further comprising a radial sealing element that encloses the sleeve arranged axially between the flange and the retaining bushing.

16. The connection fitting of claim 13, wherein the compression spring is located between the cylindrical fitting section and the sleeve.

17. The connection fitting of claim 11, wherein the section of the sealing ring comprises a collar that extends radially outward.

\* \* \* \* \*